(12) United States Patent
Chretien

(10) Patent No.: US 12,378,969 B2
(45) Date of Patent: Aug. 5, 2025

(54) CONTROLLER AND DRIVE CIRCUIT FOR ELECTRIC MOTORS

(71) Applicant: Regal Beloit America, Inc., Beloit, WI (US)

(72) Inventor: Ludovic Andre Chretien, Columbia City, IN (US)

(73) Assignee: Regal Beloit America, Inc., Milwaukee, WI (US)

( * ) Notice: Subject to any disclaimer, the term of this patent is extended or adjusted under 35 U.S.C. 154(b) by 138 days.

(21) Appl. No.: 17/725,873

(22) Filed: Apr. 21, 2022

(65) Prior Publication Data

US 2022/0341434 A1 Oct. 27, 2022

Related U.S. Application Data

(60) Provisional application No. 63/177,715, filed on Apr. 21, 2021.

(51) Int. Cl.
| | | |
|---|---|---|
| *F04B 49/02* | (2006.01) | |
| *F04B 35/04* | (2006.01) | |
| *F04B 49/24* | (2006.01) | |
| *F04D 27/00* | (2006.01) | |
| *H02P 27/06* | (2006.01) | |

(52) U.S. Cl.
CPC .......... *F04D 27/00* (2013.01); *F04D 27/009* (2013.01); *H02P 27/06* (2013.01)

(58) Field of Classification Search
CPC .......... H02P 27/00; H02P 27/02; H02P 27/04; H02P 27/06; H02P 27/047; H02P 27/05; H02P 27/08; H02P 27/085; H02P 1/44; H02P 1/42; H02P 1/52; F04B 49/02; F04B 49/035; F04B 49/24; F04B 35/04
USPC .................... 318/400.17, 400.2, 400.26
See application file for complete search history.

(56) References Cited

U.S. PATENT DOCUMENTS

| | | | | |
|---|---|---|---|---|
| 2,461,375 A | * | 2/1949 | Eftihios | F25D 13/065 134/107 |
| 3,913,342 A | * | 10/1975 | Barry | F04B 49/10 318/473 |
| 5,252,905 A | * | 10/1993 | Wills | H02P 1/44 318/807 |
| 5,801,500 A | * | 9/1998 | Jensen | H02P 6/21 318/431 |
| 7,260,951 B2 | * | 8/2007 | Monk | F04B 49/035 62/196.3 |
| 2001/0045101 A1 | * | 11/2001 | Graham | B61C 17/04 62/196.3 |

(Continued)

*Primary Examiner* — Mark A Laurenzi
*Assistant Examiner* — Dnyanesh G Kasture
(74) *Attorney, Agent, or Firm* — Armstrong Teasdale LLP

(57) ABSTRACT

A control system for an electric motor in a compressor system includes a processing system configured to control an inverter to supply variable frequency power to the electric motor from the inverter. The processing system is configured to determine when to transition from supplying variable frequency power to supplying line frequency power to the electric motor. The processing system is configured to engage a pressure equalization mechanism to at least partially reduce a pressure differential developed between a suction portion and a discharge portion of the compressor system. The processing system is configured to apply line frequency power to at least one winding of the electric motor.

18 Claims, 6 Drawing Sheets

(56) References Cited

U.S. PATENT DOCUMENTS

| | | | | |
|---|---|---|---|---|
| 2005/0029976 A1* | 2/2005 | Terry | ............... | H02P 6/12 |
| | | | | 318/400.34 |
| 2007/0024232 A1* | 2/2007 | Suzuki | ............... | H02P 21/22 |
| | | | | 318/812 |
| 2008/0290824 A1* | 11/2008 | Choi | ............... | H02J 3/007 |
| | | | | 318/770 |
| 2018/0269810 A1* | 9/2018 | Chretien | ............... | H02P 1/445 |
| 2019/0305708 A1* | 10/2019 | Chretien | ............... | H02M 1/32 |
| 2019/0310005 A1* | 10/2019 | Cluff | ............... | F25B 31/026 |
| 2020/0067441 A1* | 2/2020 | Coupart | ............... | H02P 25/22 |
| 2020/0326112 A1* | 10/2020 | Hatanaka | ............... | F25B 49/022 |
| 2021/0123639 A1* | 4/2021 | Shoemaker | ............... | F25B 41/22 |
| 2021/0254882 A1* | 8/2021 | Chitrala | ............... | F25D 23/006 |

* cited by examiner

CONTROLLER AND DRIVE CIRCUIT FOR ELECTRIC MOTORS

CROSS-REFERENCE TO RELATED APPLICATIONS

This application claims the benefit of and priority to U.S. Provisional Patent Application Ser. No. 63/177,715, filed Apr. 21, 2021, and entitled "CONTROLLER AND DRIVE CIRCUIT FOR ELECTRIC MOTORS," the contents and disclosure of which are hereby incorporated by reference in their entirety.

FIELD

The field of the disclosure relates generally to controlling electric motors, and specifically to permanent split-capacitor (PSC) and permanent magnet (PM) electric motors for compressor systems with a mechanism for modulating load on the compressor.

BACKGROUND

At least some known induction motors are fixed speed motors that operate most efficiently at line frequency power. Such motors exhibit uncontrolled acceleration during startup. Further, at low load conditions, such motors operate less efficiently. Alternatively, some induction motors may be driven with a variable speed motor controller to adapt motor speed to a load level. Such configurations are generally limited by power factor, electromagnetic interference, and electrical losses.

A drive circuit for certain motors enables efficient operation at both high and low load conditions. For example, a motor operating a compressor in a heating, ventilation and air conditioning (HVAC) system may experience high load conditions during peak temperatures and low load conditions during milder temperatures. The drive circuit operates the motor using an inverter under low load conditions, and operates the motor using line frequency power under high load conditions.

BRIEF DESCRIPTION

In one aspect, a control system for an electric motor in a compressor system is provided. The control system includes a processing system configured to control an inverter to supply variable frequency power to the electric motor from the inverter. The processing system is configured to determine when to transition from supplying variable frequency power to supplying line frequency power to the electric motor. The processing system is configured to engage a pressure equalization valve to at least partially reduce a pressure differential developed between a suction portion and a discharge portion of the compressor system. The processing system is configured to apply line frequency power to at least one winding of the electric motor.

In another aspect, a method for controlling an electric motor in a compressor system is provided. The method includes controlling an inverter to supply variable frequency power to the electric motor from the inverter. The method further includes determining when to transition from supplying variable frequency power to supplying line frequency power to the electric motor. The method further includes engaging a pressure equalization mechanism to at least partially reduce a pressure differential developed between a suction portion and a discharge portion of the compressor system. The method further includes applying line frequency power to at least one winding of the electric motor.

In another aspect, a compressor system is provided. The compressor system includes an electric motor and a control system. The control system includes a processing system configured to control an inverter to supply variable frequency power to the electric motor from the inverter. The processing system is further configured to determine when to transition from supplying variable frequency power to supplying line frequency power to the electric motor. The processing system is further configured to engage a pressure equalization mechanism to at least partially reduce a pressure differential developed between a suction portion and a discharge portion of the compressor system.

The processing system is further configured to apply line frequency power to at least one winding of the electric motor.

DETAILED DESCRIPTION

Figure 1:
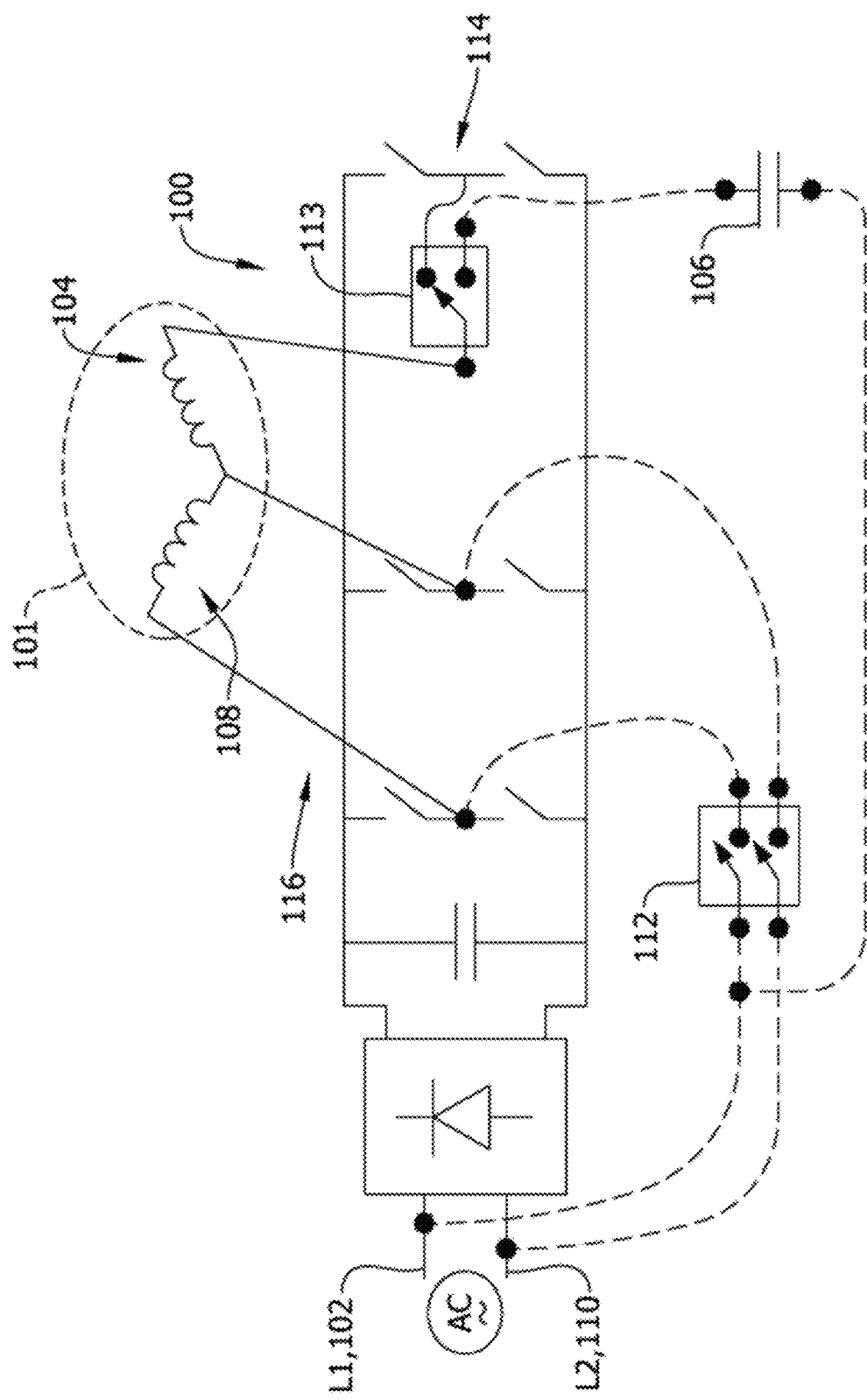
FIG. 1 is a schematic diagram of a known drive circuit for an electric motor.

When starting a compressor, the load on the electric motor is generally low and builds over time as suction and discharge pressures increase the torque demand on the electric motor. The torque output of the electric motor operating on line frequency power generally exceeds the starting load of the compressor, when pressures are near equal. However, if the load, i.e., the torque demand, exceeds the torque output from the electric motor, the electric motor cannot accelerate and instead decelerates, or "stalls." For example, the electric motor cannot start if stopped, i.e., is locked; or decelerates if turning under power, i.e., stalls. This can occur after the compressor operates for a period of time to build suction and discharge pressures, creating a pressure differential across the compressor and resulting in a large torque demand. The large torque demand, i.e., large load, can generally be met if the electric motor is already turning under power; however, if the drive circuit for the electric motor has limited power output, for example, in a variable speed drive, then the electric motor may stall and decelerate when the load exceeds the maximum power output of the drive circuit. If the electric motor is stopped, the starting torque output may not overcome the load and the rotor would remain locked until the pressure differential dissipates.

At least some compressor systems include an interlock time period during which restart of the electric motor is prevented to allow the pressures to equalize. The interlock time is often on the order of several minutes in duration, during which the compressor cannot operate. Alternatively, some compressor systems include a mechanism for equalizing pressures within the compressor by introducing a bypass in the fluid system between the suction and discharge pressure chambers. The mechanism generally includes a valve in the fluid system to enable immediate pressure equalization when the compressor and electric motor are stopped. The pressure equalization mechanism may also be constructed, positioned, or otherwise incorporated external to the compressor. Alternatively, the mechanism may include a reversing valve, e.g., on heat pumps, to equalize pressures when the heat pump is stopped.

In compressor systems utilizing a hybrid drive (i.e., where the electric motor is supplied power through an inverter under low load conditions and supplied line frequency power under high load conditions), torque demand, or load, can exceed the power output capacity of the inverter or the torque output of the electric motor near the transition point. Generally, the inverter and line frequency power cannot both be connected to the electric motor at the same time, because of the potential for a line-to-line short circuit. To transition from inverter to line, or line to inverter, one is disconnected before connecting the other. When transitioning from the inverter to line frequency power, the transient torque output at line frequency power may fall below the torque demand from the compressor, leading to a decrease in compressor speed and finally a stall condition. Or, for example, the inverter may reach a maximum current output under certain load conditions before transitioning to line frequency power; the inverter may reach maximum operating temperature under certain load conditions before transitioning to line frequency power; or the electric motor, given the "slip" experienced when transitioning to line frequency power, cannot generate the torque demand under certain load conditions. Consequently, the electric motor, under high loading, could stall when attempting to transition from medium operating speed on the inverter to full speed on line frequency power.

At least some drive circuits communicate with at least one controller (e.g., a motor controller, a system controller, etc.) configured to dynamically determine when the drive circuit should transition from supplying variable frequency current from the inverter to supplying line frequency current such that the electric motor is in constant operation through the transition (e.g., no restart is required). The controller, for example, determines a maximum operating speed of the inverter (e.g., by measuring speed and current during operation at low speed) and, based on the determined maximum operating speed of the inverter, control the drive circuit to transition to supplying line frequency current before the maximum operating speed of the inverter is reached. The drive circuits, motor controller, and system controller may be separate circuitry or combined circuitry.

Alternatively, the disclosed controllers and drive circuits are configured to dynamically determine when to engage a pressure equalization mechanism for transitioning from supplying variable frequency current from the inverter to supplying line frequency current. More generally, the disclosed controllers and drive circuits determine when and by how much the load should be reduced to enable acceleration when the electric motor is otherwise unable to accelerate. Engaging the pressure equalization mechanism at or near the transition point enables the load on the compressor to be modulated below the power output of the inverter and below the torque output of the electric motor to avoid stall while transitioning to line frequency power.

In an example embodiment, when the motor controller is controlling the drive circuit to supply variable frequency current to the electric motor, the motor controller or system controller are configured to estimate a maximum speed the inverter can achieve (e.g., based on measurements such as low speed current, low speed, pressure buildup, and temperature). The system then determines the maximum speed based on at least one input parameter (e.g., such as the examples above, as received from another device, or measured locally at the electric motor or compressor) and at least one of a lookup table and polynomial stored in a memory of the motor controller or system controller. Upon determining the drive circuit should transition to supplying line frequency current (e.g., depending on whether the maximum operating speed of the inverter is approaching, or is within a predefined range from, the received potential maximum operating speed of the inverter), the motor controller or system controller engages the pressure equalization mechanism to reduce the compressor load, e.g., to near zero or at least below the torque output achievable by the electric motor. In certain embodiments, engaging the pressure equalization mechanism includes at least partially opening a pressure equalization valve in the fluid system to reduce the differential suction and discharge pressures in the compressor, resulting in a reduced compressor load. In certain embodiments the pressure equalization mechanism is internal to the compressor. Alternatively, the pressure equalization mechanism is external to the compressor and coupled to the fluid lines. The motor controller then completes the transition to line frequency power under the reduced load, i.e., the modulated compressor load, and accelerates to the desired speed or torque output for the given load conditions.

The pressure equalization mechanism includes, for example, a valve that is electronically controlled by components of the motor controller, the system controller, or by components independent of the motor controller and system controller. Such components may include, for example, analog drive components (e.g., transistors, diodes, capacitors, etc.) for supplying current to a solenoid for opening and closing the valve, and digital components (e.g., microcontroller) for controlling current supplied to the solenoid by the analog components.

Generally, the disclosed process for engaging a pressure equalization valve for modulating the compressor load occurs within one or two line frequency cycles from determining the electric motor is to transition to line frequency power, or about 16 milliseconds. Accordingly, the duration of "down time" for the compressor is on the order of milliseconds, and the overall operation of the compressor system is not impacted through the transition from variable frequency power to line frequency power. Alternatively, the electric motor and compressor could be stopped for a longer duration while the pressure equalization mechanism is engaged, and pressures are equalized.

In one example embodiment, the motor controller, system controller, or other remote device determine the electric motor should transition from supply through the inverter to line frequency power. The motor controller disables current output from the inverter. The pressure equalization mechanism includes a microcontroller that receives a command from the motor controller, the system controller, or other remote device to engage the pressure equalization valve to at least reduce the pressure differential and therefore the load on the compressor. The motor controller then resumes operation of the electric motor and compressor under line frequency power after a period of time, upon receiving a second command to apply line frequency power, or upon determining the load is sufficiently reduced to operate the electric motor under line frequency power.

In one example embodiment, alone or in combination with one or more of the above embodiments, the motor controller, system controller, or other remote device, while operating the electric motor and compressor under variable frequency power for a partial load, determine the load on the inverter exceeds a threshold (e.g., a current threshold, temperature threshold, input power threshold, etc.). In response to determining an overage exists, the motor controller is instructed to disable current output from the inverter, and the pressure equalization mechanism is engaged to at least reduce the pressure differential and therefore the load on the compressor. The motor controller then resumes operation of the electric motor and compressor under line frequency power.

In one example embodiment, alone or in combination with one or more of the above embodiments, the motor controller, system controller, or other remote device receive a command to transition to operation under line frequency power. The motor controller continues operating the compressor while the electric motor is supplied variable frequency power from the inverter. The system controller, motor controller, or other remote device engage the pressure equalization mechanism to at least reduce the pressure differential and therefore the load on the compressor. The motor controller then synchronizes the compressor speed with line frequency and completes the transition to line frequency power without stopping the compressor.

In one example embodiment, alone or in combination with one or more of the above embodiments, the motor controller, system controller, or other remote device, while operating the electric motor and compressor under variable frequency power for a partial load, determine the load on the inverter exceeds a threshold (e.g., a current threshold, temperature threshold, input power threshold, etc.). In response to determining an overage exists, the motor controller continues operating the electric motor and compressor under power through the inverter, and the pressure equalization mechanism is engaged to at least reduce the pressure differential and therefore the load on the compressor. The motor controller then synchronizes the compressor speed with line frequency and completes the transition to line frequency power without stopping the compressor.

In one example embodiment, for a multi-phase induction motor, the motor controller, system controller, or other remote device operate the electric motor under variable frequency power for a partial load. The motor controller, system controller, or other remote device receive a command to transition to line frequency power, determine the load on the inverter exceeds a threshold, or otherwise determines the electric motor should transition to line frequency power. The pressure equalization mechanism is then engaged to at least reduce the pressure differential and therefore the load on the compressor. The motor controller then commutates one winding (e.g., a first winding) to line frequency power and continues supply of variable frequency power from the inverter to another winding (e.g., a second winding). While transitioning the first winding onto line frequency power, in certain embodiments, the pressure equalization mechanism remains engaged until a desired speed or torque output is achieved. Alternatively, in other embodiments, the pressure equalization mechanism may be disengaged, and the motor controller controls current supply to the windings to produce motoring torque to accelerate to the desired speed or torque output. When the electric motor and compressor are operating under full load, one or more winding is supplied line frequency alternating current (AC) power while control is focused on the one or more windings supplied variable frequency power through the inverter.

In one example embodiment, for a multi-phase PM motor, the motor controller, system controller, or other remote device operate the electric motor under variable frequency power for a partial load. The motor controller, system controller, or other remoted device receive a command to transition to line frequency power, determine the load on the inverter exceeds a threshold, or otherwise determines the electric motor should transition to line frequency power. The pressure equalization mechanism is then engaged to at least reduce the pressure differential and therefore the load on the compressor. The motor controller then disables current output from the inverter for one winding (e.g., a first winding), and accelerates the electric motor under a reduced load using variable frequency current supplied from the inverter to another winding (e.g., a second winding). Once a desired compressor speed is reached, the motor controller and inverter control the variable frequency current supplied to the second winding to synchronize the motor fundamental frequency and the line frequency. The motor controller and inverter further control the variable frequency current supplied to the second winding such that the relative phase of the variable frequency current in the second winding and the line frequency current in the first winding enables the first winding to produce motoring torque. When the electric motor and compressor are operating under full load, one or more winding is supplied line frequency alternating current (AC) power while control is focused on the one or more windings supplied variable frequency power through the inverter.

In some example embodiments, the motor controller is further configured to compute a target reduction in the pressure differential to enable complete transition to line frequency power.

FIG. 1 is a schematic diagram of a known drive circuit 100 for an electric motor 101, such as a PSC motor. During normal line frequency operation, line frequency current, such as 50 Hertz or 60 Hertz, for example, is supplied on a first line, or L1, 102, through a run capacitor 106, to a start winding 104, and to a main winding 108. A second line, or L2, 110 provides a return, or neutral, for the line frequency current. Drive circuit 100 includes a contactor 112 for connecting and disconnecting L1 and L2 to the PSC motor. Contactor 112 is a two pole mechanical contactor that is commutated by energizing a coil (not shown). In certain embodiments, run capacitor 106 may be coupled to L1 on either side of contactor 112. A relay 113 is coupled between run capacitor 106 and start winding 104.

Drive circuit 100 includes an inverter 114 that is enabled to drive electric motor 101 with variable frequency power under low load, or at least less than full load, conditions. Drive circuit 100 is supplied line frequency power on L1 and L2. Inverter 114 enables variable speed operation of electric motor 101 by regulating amplitude, phase, and frequency of alternating current (AC) voltages on output terminals thereof, which are coupled to main winding 108 and start winding 104. When operating electric motor 101 using inverter 114, contactor 112 is open and inverter 114 is enabled via any suitable control means, e.g., analog or digital control signals. To transition to line frequency power, inverter 114 is disabled, contactor 112 is closed, and relay 113 is commutated to couple L1 and L2 directly to electric motor 101.

As shown in FIG. 1, drive circuit 100 includes six wired connections, contactor 112, and run capacitor 106. These components contribute to a relatively high cost and complexity of drive circuit 100. Moreover, electric motor 101 includes integrated winding connections 116. In particular, winding connections 116 between drive circuit 100 and windings 104, 108 are integrated or tied, such that at least one connection is coupled to both main winding 108 and start winding 104. Although electric motor 101 is illustrated as a PSC motor, it is recognized that other known motors (such as permanent magnet or electronically commutated motors (ECMs)) also have integrated windings (e.g., between windings of a three-phase ECM).

Figure 2:
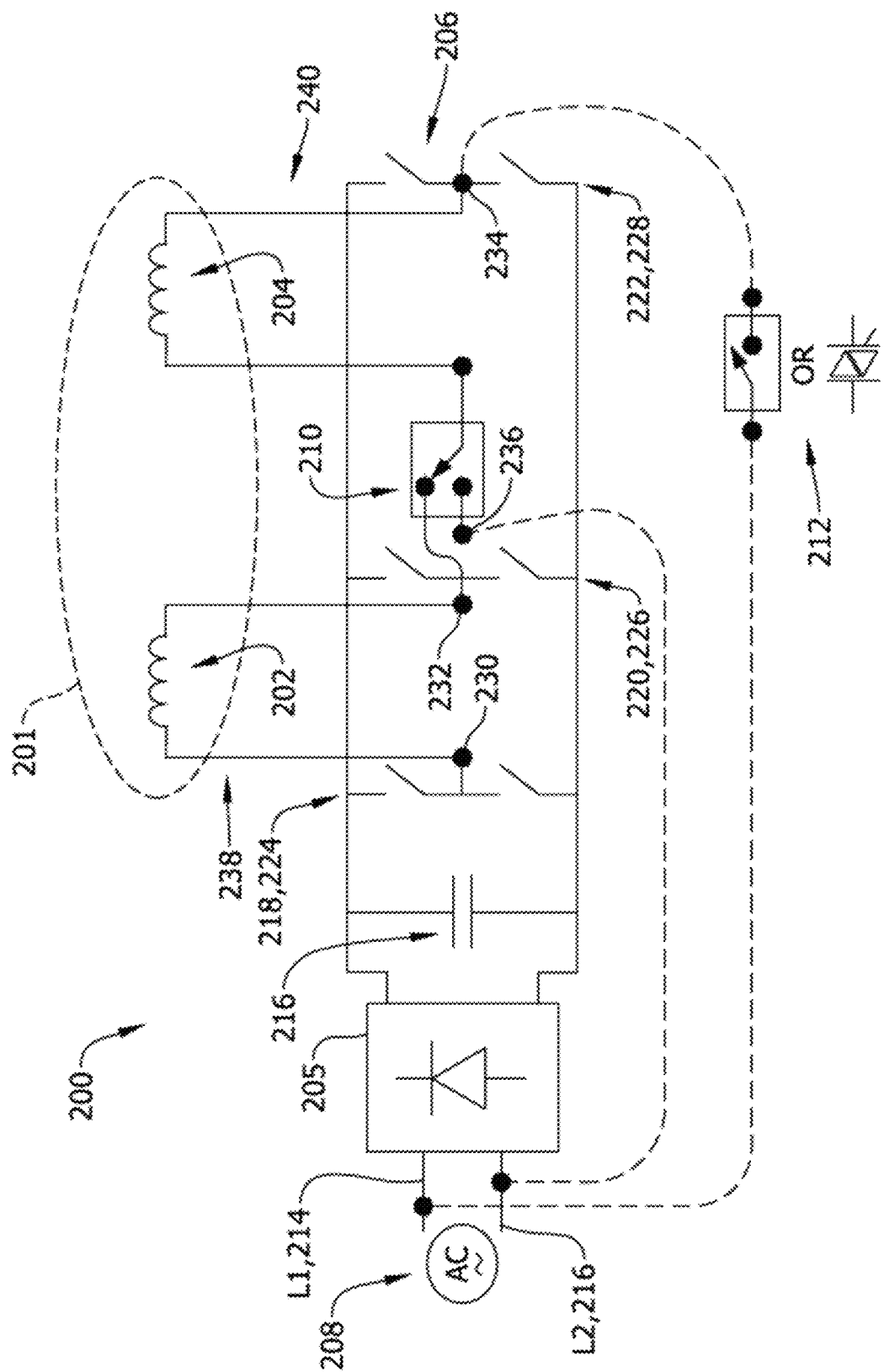
FIG. 2 is a schematic diagram of an exemplary load-shifting drive circuit for an electric motor, in accordance with the present disclosure.
Figure 3:
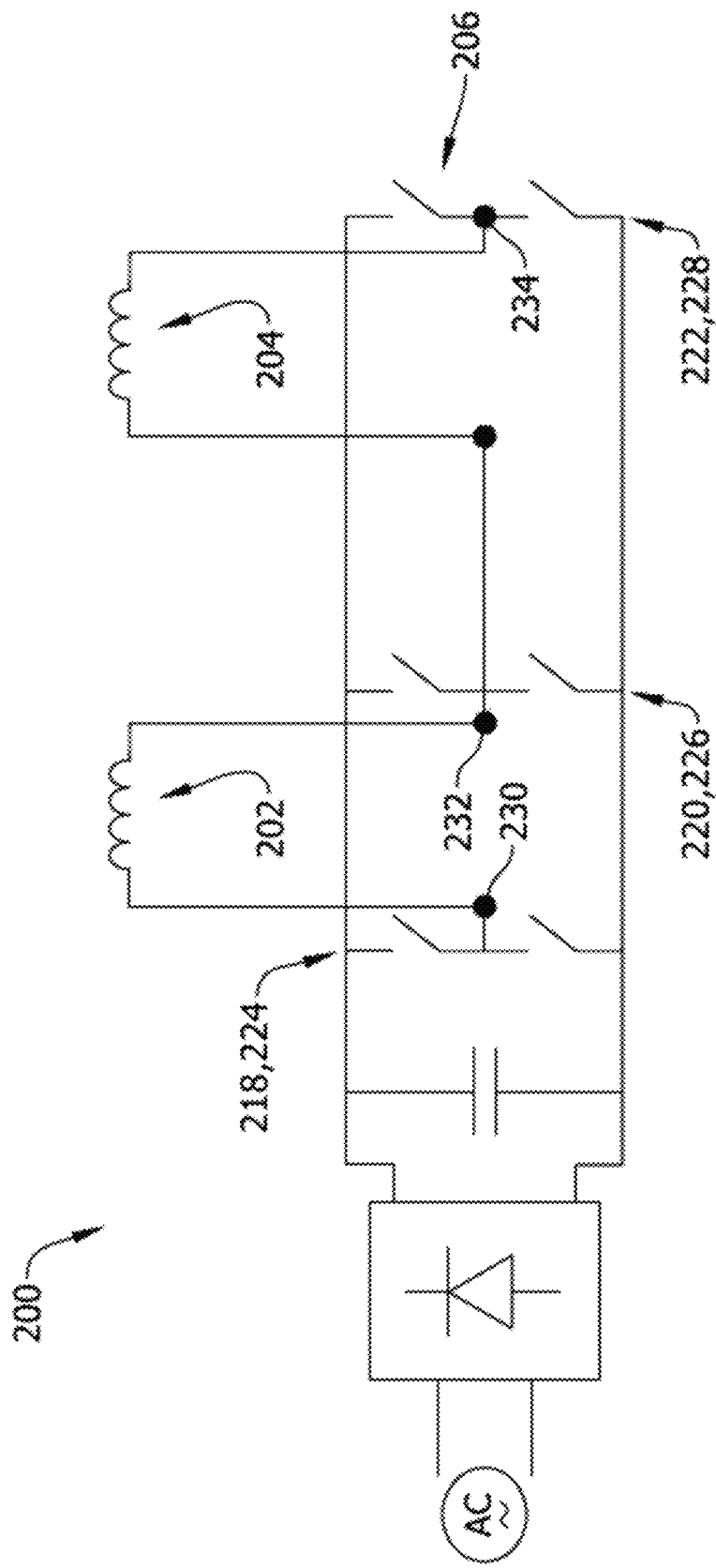
FIG. 3 is a schematic diagram of the load-shifting drive circuit shown in FIG. 2 in a first mode of operation.
Figure 4:
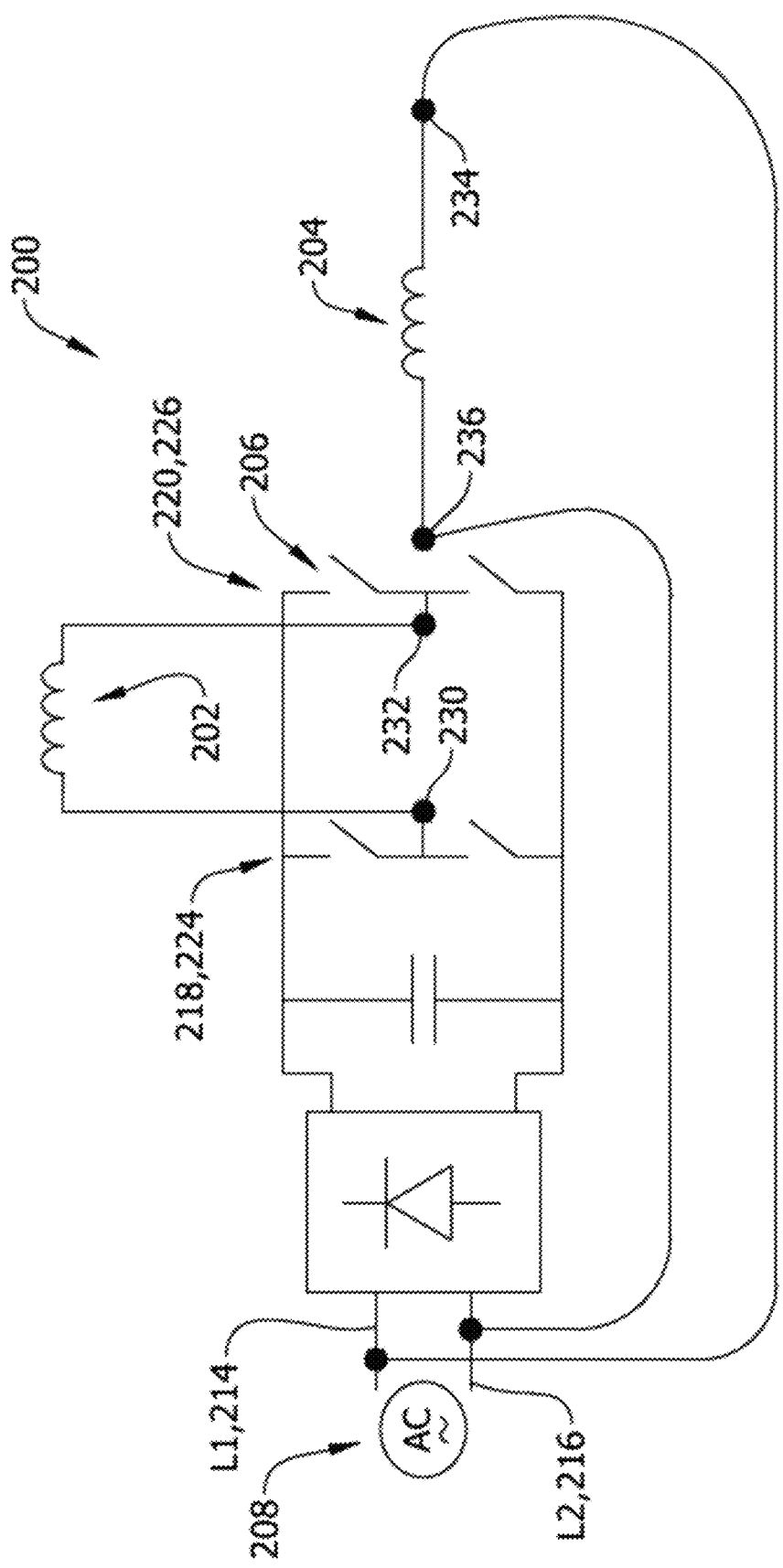
FIG. 4 is a schematic diagram of the load-shifting drive circuit shown in FIG. 2 in a second mode of operation.

FIG. 2 is a schematic diagram of an exemplary load-shifting drive circuit 200, in accordance with the present disclosure. FIG. 3 shows drive circuit 200 is configured to drive an electric motor 201 (e.g., an induction motor) according to a first mode of operation under partial load conditions, and FIG. 4 shows drive circuit 200 configured to drive electric motor 201 according to a second mode of operation under full load conditions. Broadly, under the first mode of operation, two windings 202, 204 of electric motor 201 are driven using an inverter 206; and under the second mode of operation, first winding 202 is driven using inverter 206 and second winding 204 is driven directly with line frequency current from an AC source 208. The terms line frequency current, voltage, and/or power are used interchangeably herein to refer to direct electrical communication with AC source 208.

In particular, drive circuit 200 includes a rectifier 205, inverter 206 downstream from rectifier 205, a first switch (e.g., a relay) 210 in series with second winding 204, and a second switch (e.g., a contactor) 212. First switch 210 and/or second switch 212 may be embodied as mechanical/electromechanical contactors, electronic switches, and/or or solid-state switches. Under the first mode of operation, as shown in the equivalent circuit depicted in FIG. 3, second switch 212 is open, and drive circuit 200 is configured to drive the induction motor using inverter 206. Inverter 206 enables variable speed operation of the induction motor by regulating current provided to first winding 202 and second winding 204, by controlling amplitude, phase, and frequency of current and voltage on output terminals thereof, which are coupled to first winding 202 and second winding 204.

In the illustrated embodiment, inverter 206 includes a capacitor 216 and a plurality of switches arranged in three parallel sets of switches 218, 220, 222, also referred to as phases 224, 226, and 228, respectively, of inverter 206 (e.g., first set of switches 218 may be referred to as a first phase 224 of inverter, second set of switches 220 may be referred to as a second phase 226 of inverter 206, and third set of switches 222 may be referred to as a third phase 228 of inverter 206). First winding 202 is coupled to first phase 224 at a first node 230 and to second phase 226 at a second node 232. Under the first mode of operation of drive circuit 200, second winding 204 is coupled to third phase 228 at a third node 234 and is coupled to second phase 226 through first switch 210.

Rectifier 205 rectifies power from AC source, capacitor 216 functions as a storage element for the rectified power from rectifier 205, and sets of switches 218, 220, 222 (phases 224, 226, and 228) operate to regulate current provided to windings 202, 204, in the first mode of operation.

To transition to the second mode of operation, shown in the equivalent circuit depicted in FIG. 4, third set of switches 222 (third phase 228 of inverter 206) is disabled (e.g., switches 222 are opened), first switch 210 is commutated, and second switch 212 is closed, to couple AC source 208 directly to second winding 204. In transitioning from the first mode of operation to the second mode of operation, as shown in the equivalent circuit depicted in FIG. 4, the load is shifted from inverter 206 to both inverter 206 and line frequency voltage and current from AC source 208. Second winding 204 is coupled to AC source 208 through a first line, L1, 214, at third node 234, through (closed) second switch 212. Second winding 204 is also coupled to AC source 208 through a second (return or neutral) line, L2, 216, at a fourth node 236, through first switch 210. First winding 202 remains coupled to inverter 206. More specifically, first winding 202 remains coupled to first phase 224 at first node 230 and to second phase 226 at second node 232, and sets of switches 218, 220 (first and second phases 224, 226 of inverter 206) operate to regulate current to first winding 202.

First switch 210 and/or second switch 212 may be controlled (e.g., closed, opened, commutated) by any suitable control means, such as, for example, a microcontroller, a field programmable gate array (FPGA), a digital signal processing (DSP) device, a remote system controller, a local system controller, and the like. First switch 210 and/or second switch 212 may be controlled to enable switching between the first and second modes of operation (e.g., driving second winding 204 using inverter 206 or directly with line frequency voltage and current from AC source 208) within about 1 line cycle or less.

In one example, a compressor driven by the induction motor 201 has a 5 kW full load power requirement and a 2.5 kW partial load power requirement. When operating under partial load conditions, or according to the first mode of operation of drive circuit 200, inverter 206 is supplied line frequency power, of 2.5 kW, on L1 and L2. Both windings 202, 204 are driven using inverter 206, and the load is divided therebetween (e.g., 1.25 kW on first winding 202 and 1.25 kW on second winding 204).

When operating under full load conditions, or according to the second mode of operation, inverter 206 is still supplied line frequency power on L1 and L2, of 2.5 kW. First winding 202 is driven using inverter 206, with the full load from inverter 206, 2.5 kW, on first winding 202. Second winding 204 is driven with line frequency voltage and current from AC source 208, over L1 and L2, also of 2.5 kW. Accordingly, full power is supplied to the compressor under the full load conditions. However, full power is not supplied through inverter 206, and inverter 206 need only be rated to supply partial power, which enables reducing the size, cost, and/or complexity of inverter 206.

In the exemplary embodiment, electric motor 201 includes independent winding connections 238, 240 between drive circuit 200 and first winding 202 and between drive circuit 200 and second winding 204, respectively. In some embodiments, connections 238, 240 to windings 202, 204 are made external to electric motor 201 such that connections 238, 240 to windings 202, 204 can be made independent. Accordingly, drive circuit 200 operates as described above, with only one winding (e.g., second winding 204) directly coupled to AC source 208 (shown in FIG. 2) in the second mode of operation. Windings 202, 204 are electrically isolated in the second mode of operation of drive circuit 200.

Drive circuit 200 eliminates the run capacitor (e.g., run capacitor 106) of known hybrid drive circuits. Accordingly, motors (e.g., electric motor 201) using drive circuit 200 are distinct from permanent split capacitor motors.

In addition, drive circuit 200 has a simplified wiring scheme, compared to drive circuit 100 and other known drive circuits. In particular, drive circuit 200 includes a reduced number of wiring connections. In some embodiments, first switch 210 is integrated into an internal printed circuit board (not shown), and therefore the wiring between first switch 210 and L1 is incorporated into that printed circuit board. In some embodiments, the wiring connection between L2 and second switch 212, and between second switch 212 and second winding 204 is external, and drive circuit 200 includes only two external connections. In other embodiments, these wiring connections are also fully integrated, thereby eliminating external wiring connections.

Electric motor 201 may be an induction motor, such as a PSC motor, or a permanent magnet motor, such as an ECM. Moreover, electric motor 201 may drive a compressor, or may drive any other fluid-moving apparatus, such as a fan, blower, impeller, pump, and the like.

Figure 5:
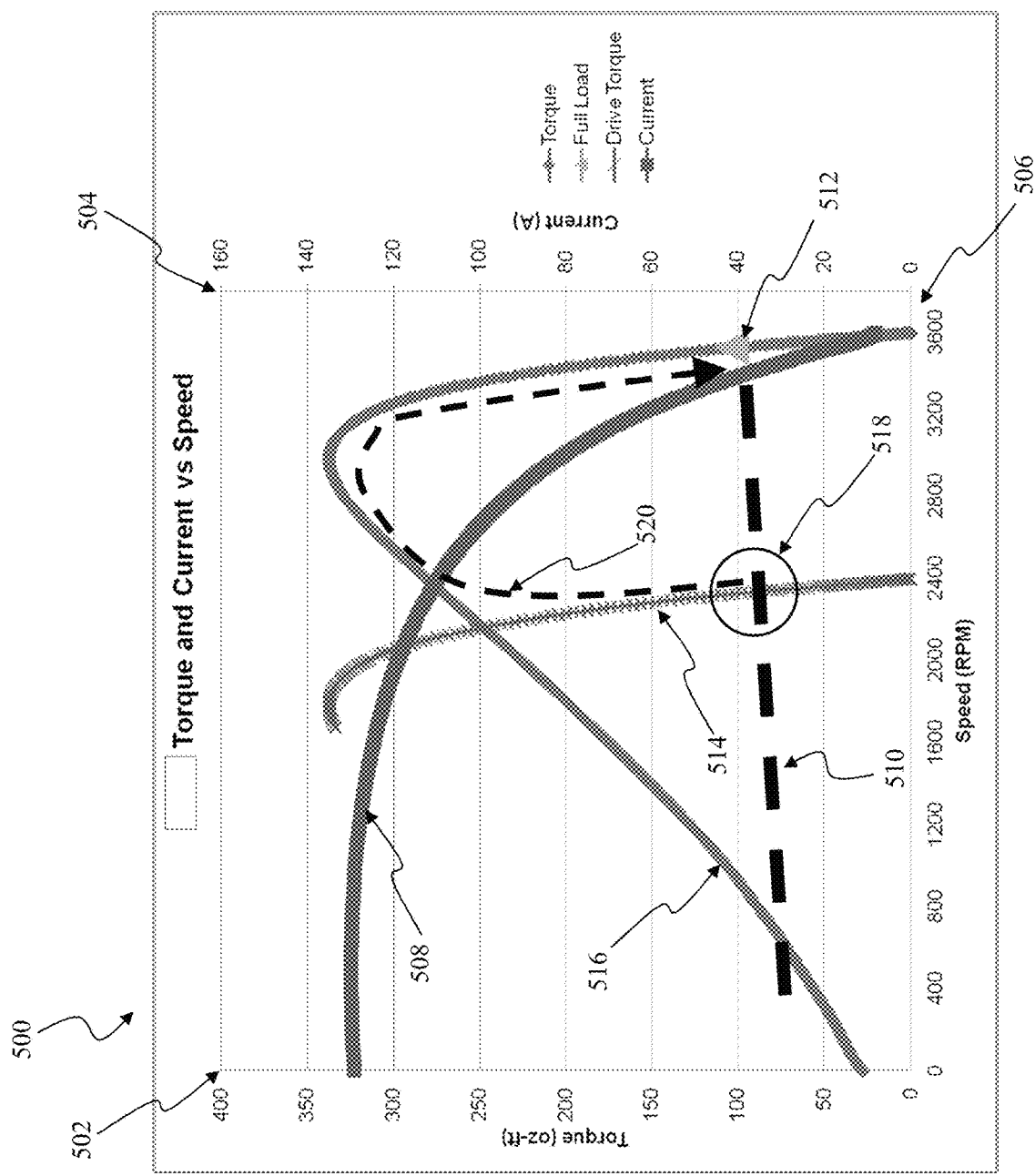
FIG. 5 is a graph of torque, speed, and current for an electric motor.

FIG. 5 is a graph 500 of torque, speed, and current for an electric motor, such as PSC motor 101, shown in FIG. 1. Graph 500 includes a left vertical axis 502 representing torque in ounce-feet (oz-ft), ranging from zero ounce-feet to 400 ounce-feet. Graph 500 includes a right vertical axis 504 representing current supplied to the electric motor in Amperes (A), ranging from zero Amperes to 160 Amperes. Graph 500 includes a horizontal axis 506 representing speed of the electric motor in rotations per minute (RPM), ranging from zero RPM to above 3600 RPM.

Graph 500 includes a current curve 508 that represents the current demanded by the electric motor versus the motor speed. Current curve 508 is relatively high and flat as the motor starts and builds speed. Demanded current falls as motor speed increases, falling gradually at lower speeds and falling with an increasing negative slope as motor speed increases.

Graph 500 includes a torque load curve 510 representing the peak torque of the electric motor versus motor speed that the electric motor must deliver when operating the system. Torque load curve 510 is the load the electric motor is required to provide to operate the system. Torque load curve 510 further defines a steady state load torque value 512, represented as a triangle on torque load curve 510.

Graph 500 includes a torque curve 514 that represents the theoretical torque output of the electric motor while being driven by an inverter in a drive circuit, such as, for example, drive circuit 100 and inverter 114, shown in FIG. 1. Torque curve 514 illustrates operation of the electric motor at speeds no greater than 2400 RPM and producing high levels of torque output.

Graph 500 includes a torque curve 516 that represents the torque output of the electric motor while being driven at line frequency power. Torque curve 516, notably, operates with little torque output when starting from zero RPM. Torque curve 516 and torque load curve 510 illustrate, at low speeds, the torque output of the electric motor is below torque load curve 510. As motor speed increases, torque curve 516 is relatively linear until its peak around 3000 RPM, above which torque output declines rapidly.

Graph 500 further includes an intersection 518 of torque curve 514 and torque load curve 510. Intersection 518 represents the point at which drive circuit 100 controls the transition from electric motor 101 being driven by inverter 114 to being driven by line frequency power. As described further herein, intersection 518 will vary on graph 500 based on different determinations made by at least one motor controller or system controller. Upon supply of line frequency current by drive circuit 100, the electric motor accelerates along a transition torque curve 520 until peak torque 512 is reached on torque load curve 510.

Figure 6:
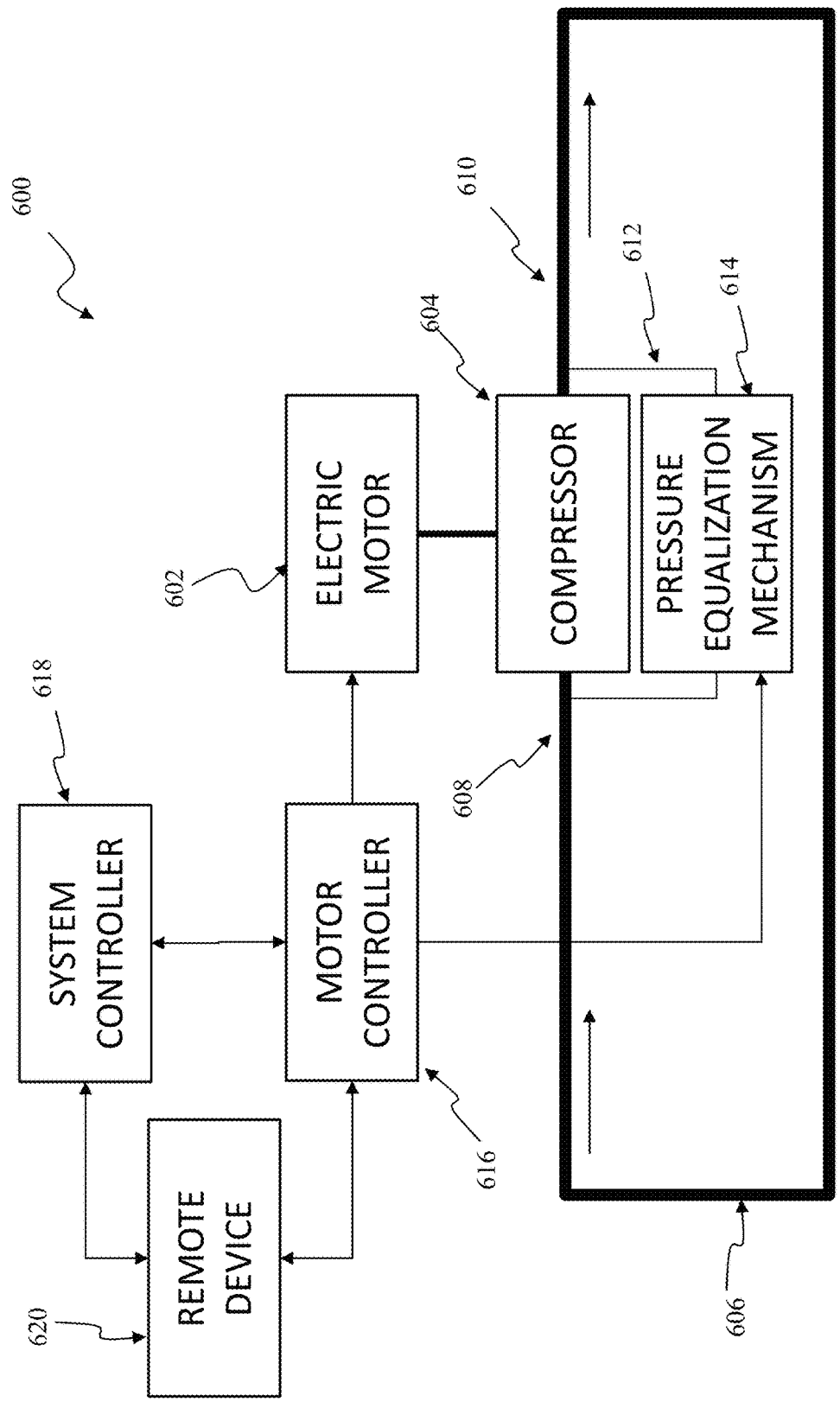
FIG. 6 is a block diagram of a control system for an electric motor in a compressor system.

FIG. 6 is a block diagram of an example compressor system 600 including, for example, an electric motor 602 mechanically coupled to a compressor 604. Electric motor 602 may include, for example, a PM motor or a PSC motor. For example, compressor system 600 may be used with the electric motor and drive circuit shown in FIG. 1. In another example, compressor system 600 may be used with the two-phase electric motor and drive circuit shown in FIG. 2. Further, the two-phase motor shown in FIG. 2 may include an induction motor or a permanent magnet motor.

Compressor 604 is coupled with a fluid system 606 such as a refrigerant system. Fluid system 606 includes a suction portion 608 and a discharge portion 610 between which a pressure differential can develop during operation of compressor 604. Pressure equalization mechanism 614 may be incorporated internally or externally to compressor 604.

Fluid system 606 also includes a bypass fluid path 612 in which a pressure equalization mechanism 614 is positioned. Pressure equalization mechanism 614 may include, for example, a pressure equalization valve coupled with the bypass fluid path 612 and configured to at least partially reduce a pressure differential across compressor 604, or between suction portion 608 and discharge portion 610.

Electric motor 602 is controlled by a combination of a motor controller 616, a system controller 618, and, in certain embodiments, a remote device 620. Motor controller 616 includes, for example, power electronics and digital control components for rectifying line frequency power, supplying direct current (DC) voltage, and inverting, or generating, variable frequency power that is supplied to the stator windings of electric motor 602. Motor controller 616 may further include control components for controlling operation of pressure equalization mechanism 614, such as, for example, a microcontroller and one or more analog components for operating a solenoid to open and close, e.g., a pressure equalization valve. Alternatively, the control components of pressure equalization mechanism 614 may be incorporated into system controller 618, remote device 620, or another device.

System controller 618 communicates with motor controller 616, for example, to transmit and receive commands or information from a user, and to perform system level control of compressor system 600. System controller 618 may include, for example, a thermostat.

Remote device 620 may include a computing device such as a smart phone, a PC, tablet, server, or other computing system suitable for carrying out one or more control or user interface functions for compressor system 600. Remote device 620, system controller 618, and motor controller 616 communicate among each other in a wired or wireless manner using, for example, serial channel, CAN bus, Bluetooth, Wi-Fi, ZigBee, or any other suitable wired or wireless communication protocol. In certain embodiments, motor controller 616, system controller 618, and remote device 620 may be incorporated into a single package with the electric motor 602, or in a single package for the compressor system 600. Motor controller 616, system controller 618, ore remote device 620 may, in certain embodiments, be modularly packaged and positioned within the single package, or positioned separate from each other.

Some embodiments involve the use of one or more electronic or computing devices (e.g., for controlling operation of a drive circuit and/or individual components thereof). Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the terms: processor, processing device, and controller.

In the embodiments described herein, memory may include, but is not limited to, a computer-readable medium, such as a random-access memory (RAM), and a computer-readable non-volatile medium, such as flash memory. Alternatively, a floppy disk, a compact disc—read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

As used herein, the terms "software" and "firmware" are interchangeable and include any computer program stored in memory for execution by a processor, including RAM memory, ROM memory, EPROM memory, EEPROM memory, and non-volatile RAM (NVRAM) memory. The above memory types are examples only and are thus not limiting as to the types of memory usable for storage of a computer program.

As used herein, an element or step recited in the singular and preceded with the word "a" or "an" should be understood as not excluding plural elements or steps, unless such exclusion is explicitly recited. Furthermore, references to "example implementation" or "one implementation" of the present disclosure are not intended to be interpreted as excluding the existence of additional implementations that also incorporate the recited features.

The systems and methods described herein are not limited to the specific embodiments described herein, but rather, components of the systems and/or steps of the methods may be utilized independently and separately from other components and/or steps described herein.

This written description uses examples to provide details on the disclosure, including the best mode, and also to enable any person skilled in the art to practice the disclosure, including making and using any devices or systems and performing any incorporated methods. The patentable scope of the disclosure is defined by the claims and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A control system for an electric motor in a compressor system, the control system comprising:
   a motor controller coupled directly in communication with an inverter of the electric motor, a pressure equalization mechanism, and one or more switches, the motor controller configured to:
   control the inverter to supply variable frequency power to the electric motor from the inverter;
   determine when to transition from supplying variable frequency power to supplying line frequency power to the electric motor;
   estimate a maximum speed currently achievable by the electric motor based on at least one input parameter;
   if the estimated maximum speed does not meet a threshold speed for transitioning to supplying line power, engage the pressure equalization mechanism to at least partially reduce a pressure differential developed between a suction portion and a discharge portion of the compressor system during the transition from supplying variable frequency power to supplying line frequency power; and
   if the estimated maximum speed meets the threshold speed, control the one or more switches to apply line frequency power to at least one winding of the electric motor.

2. The control system of claim 1, wherein the motor controller is further configured to synchronize variable frequency power supplied by the inverter with line frequency power after engaging the pressure equalization mechanism.

3. The control system of claim 1, wherein the motor controller is further configured, in determining to transition, to receive a command to transition to line frequency power.

4. The control system of claim 1, wherein the motor controller is further configured, in determining to transition, to determine a load on the inverter exceeds a threshold for the inverter.

5. The control system of claim 1, wherein the motor controller is further configured to engage the pressure equalization mechanism until the electric motor completes acceleration to a desired speed or torque output for operating under line frequency power.

6. The control system of claim 1, wherein the motor controller is further configured to engage the pressure equalization mechanism to reduce the pressure differential by up to 90 percent.

7. The control system of claim 1, wherein the motor controller is further configured to compute a target reduction in the pressure differential to enable complete transition to line frequency power.

8. The control system of claim 1, further comprising a system controller coupled in communication with the motor controller.

9. The control system of claim 1, wherein the motor controller is further configured, in engaging the pressure equalization mechanism, to engage a pressure equalization valve.

10. A method for controlling an electric motor in a compressor system, the method performed by a motor controller coupled directly in communication with an inverter of the electric motor, a pressure equalization mechanism, and one or more switches, the method comprising:
   controlling the inverter to supply variable frequency power to the electric motor from the inverter;
   determining when to transition from supplying variable frequency power to supplying line frequency power to the electric motor;
   estimating a maximum speed currently achievable by the electric motor based on at least one input parameter;
   if the estimated maximum speed does not meet a threshold speed for transitioning to supplying line power, engaging the pressure equalization mechanism to at least partially reduce a pressure differential developed between a suction portion and a discharge portion of the compressor system during the transition from supplying variable frequency power to supplying line frequency power; and if the estimated maximum speed meets the threshold speed, controlling the one or more switches to apply line frequency power to at least one winding of the electric motor.

11. The method of claim 10, further comprising synchronizing variable frequency power supplied by the inverter with line frequency power after engaging the pressure equalization mechanism.

12. The method of claim 10, wherein determining to transition comprises receiving a command to transition to line frequency power.

13. The method of claim 10, wherein determining to transition comprises determining a load on the inverter exceeds a threshold for the inverter.

14. The method of claim 10, further comprising engaging the pressure equalization mechanism until the electric motor completes acceleration to a desired speed or torque output for operating under line frequency power.

15. The method of claim 10, further comprising engaging the pressure equalization mechanism to reduce the pressure differential by up to 90 percent.

16. The method of claim 10, further comprising computing a target reduction in the pressure differential to enable complete transition to line frequency power.

17. A compressor system comprising:
an electric motor; and
control system comprising:
a motor controller coupled directly in communication with an inverter of the electric motor, a pressure equalization mechanism, and one or more switches, the motor controller configured to:
control the inverter to supply variable frequency power to the electric motor from the inverter;
determine when to transition from supplying variable frequency power to supplying line frequency power to the electric motor;
estimate a maximum speed currently achievable by the electric motor based on at least one input parameter;
if the estimated maximum speed does not meet a threshold speed for transitioning to supplying line power, engage the pressure equalization mechanism to at least partially reduce a pressure differential developed between a suction portion and a discharge portion of the compressor system during the transition from supplying variable frequency power to supplying line frequency power; and
if the estimated maximum speed meets the threshold speed, control the one or more switches to apply line frequency power to at least one winding of the electric motor.

18. The compressor system of claim 17, wherein the control system further includes a system controller coupled in communication with the motor controller.

* * * * *